US006287493B1

(12) United States Patent
McCollum et al.

(10) Patent No.: US 6,287,493 B1
(45) Date of Patent: *Sep. 11, 2001

(54) PROCESS FOR MOLDING COMPOSITE ARTICLES

(75) Inventors: Robert P. McCollum, Transfer, PA (US); Gene E. Kirila, II, Brookfield, OH (US)

(73) Assignee: VEC Technology, Inc., Greenville, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/309,160

(22) Filed: May 10, 1999

Related U.S. Application Data

(62) Division of application No. 08/715,533, filed on Sep. 18, 1996, now Pat. No. 5,971,742.

(51) Int. Cl.[7] .................................................. B29C 45/14
(52) U.S. Cl. ........................ 264/40.6; 264/71; 264/257; 264/316; 264/328.16; 425/390
(58) Field of Search .................................... 264/257, 314, 264/316, 328.16, 69, 71, 72, 40.6; 425/390

(56) References Cited

U.S. PATENT DOCUMENTS

| 604,258 | 5/1898 | Menier . |
| 2,139,631 | 12/1938 | Dresch et al. ........................ 18/55.1 |
| 2,367,779 | 1/1945 | Hull ........................................ 18/19 |
| 2,401,299 | 6/1946 | Glavin ................................. 144/281 |
| 2,435,866 | 2/1948 | Bilhuber .............................. 144/281 |
| 2,658,237 | 11/1953 | Cuppert et al. ...................... 264/314 |
| 2,975,476 | 3/1961 | Burke ................................... 264/314 |

(List continued on next page.)

FOREIGN PATENT DOCUMENTS

| 0491650 A2 | 6/1992 | (EP) . |
| 0 744 263 A2 | 11/1996 | (EP) . |
| 879769 | 10/1961 | (GB) . |
| 4-74620 | 3/1992 | (JP) ..................................... 425/552 |
| WO 96/07532 | 3/1996 | (WO) . |
| WO 98/12034 | 3/1998 | (WO) . |

OTHER PUBLICATIONS

A. Delaney and H. Dochtermann, Plastic Molding Apparatus, IBM Technical Disclosure Bulletin, vol. 17, No. 2, pp. 479–480.
Rosato, Dominick and Rosato, Donald, Injection Molding Handbook, Van Nostrand Reinhold Co., p. 210.

* cited by examiner

Primary Examiner—Jill L. Heitbrink
Assistant Examiner—Stefan Staicovici
(74) Attorney, Agent, or Firm—Merchant & Gould P.C.

(57) ABSTRACT

A method of molding composite articles including arranging a pair of matched-tool mold sections in an opposed relationship, each mold section having a rigid housing and a thin, semi-rigid membrane removably and sealably mounted on the housing so as to define a fluid-tight chamber; filling the fluid-tight chambers with a non-compressible backing fluid; and accommodating thermal expansion of the backing fluid by an expansion chamber in fluid communication with the fluid tight chambers. The method further includes defining a mold plenum between the semi-rigid membranes when the mold sections are closed together; inserting reinforcement materials between the semi-rigid membranes prior to closing the mold sections; and injecting and curing a molding fluid after closing the mold sections. A step for regulating the temperature of the backing fluid may be included wherein a system of coils extend within each fluid tight chamber and wherein the coils are connected to an external heater/chiller unit and the coils are operative to circulate a temperature control fluid therethrough.

6 Claims, 1 Drawing Sheet

U.S. PATENT DOCUMENTS

| | | |
|---|---|---|
| 3,608,143 | 9/1971 | Schutz ........................................ 18/19 |
| 3,815,863 | 6/1974 | Andeweg ............................. 249/178 |
| 4,334,850 | 6/1982 | Garabedian .......................... 425/388 |
| 4,851,167 | 7/1989 | Marc .................................... 264/314 |
| 4,873,044 | 10/1989 | Epel ..................................... 264/313 |
| 5,015,426 | 5/1991 | Maus et al. . |
| 5,055,025 | 10/1991 | Muller .................................. 425/388 |
| 5,061,418 * | 10/1991 | Ware .................................. 264/46.6 |
| 5,152,949 | 10/1992 | Leoni et al. ......................... 264/257 |
| 5,460,761 | 10/1995 | Larsson ............................... 425/552 |
| 5,494,426 | 2/1996 | Ibar ..................................... 425/542 |
| 5,516,271 | 5/1996 | Swenor et al. . |
| 5,518,388 | 5/1996 | Swenor et al. . |

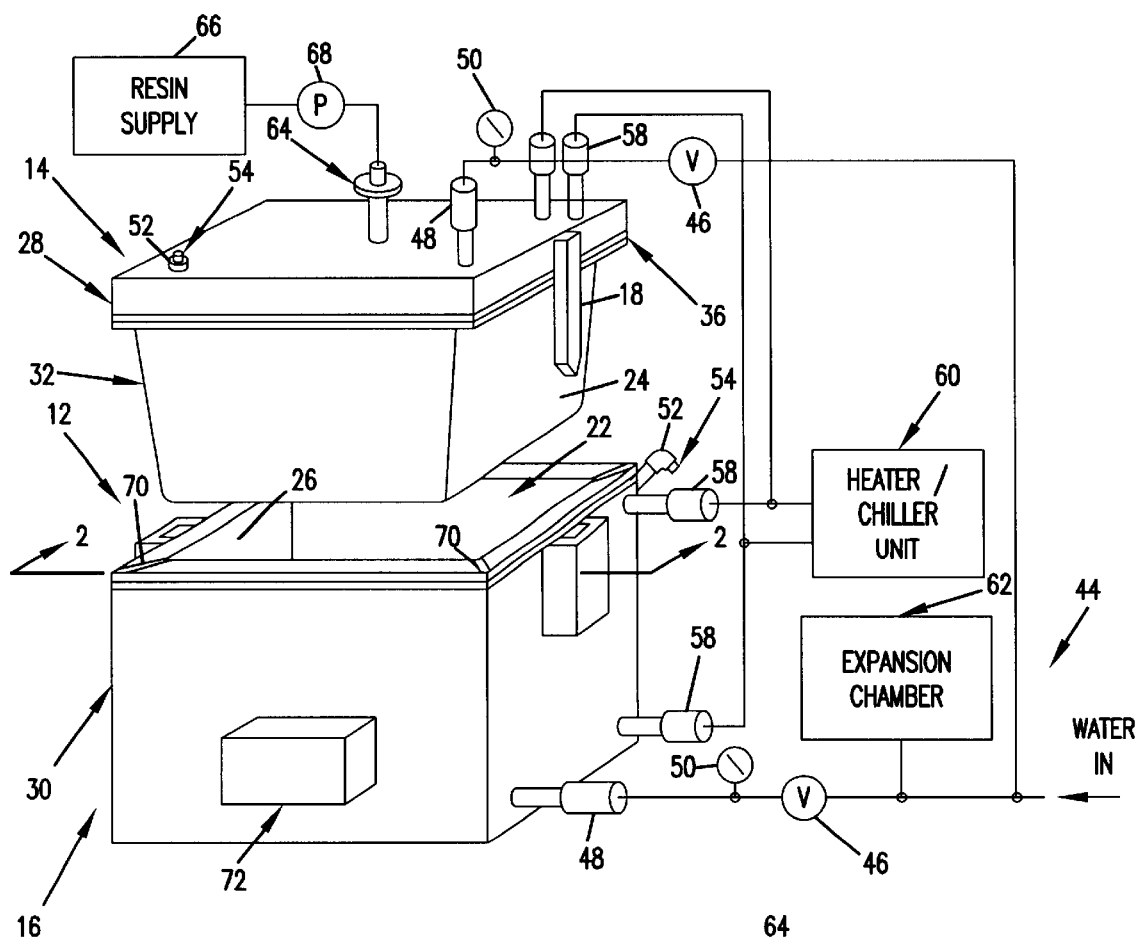
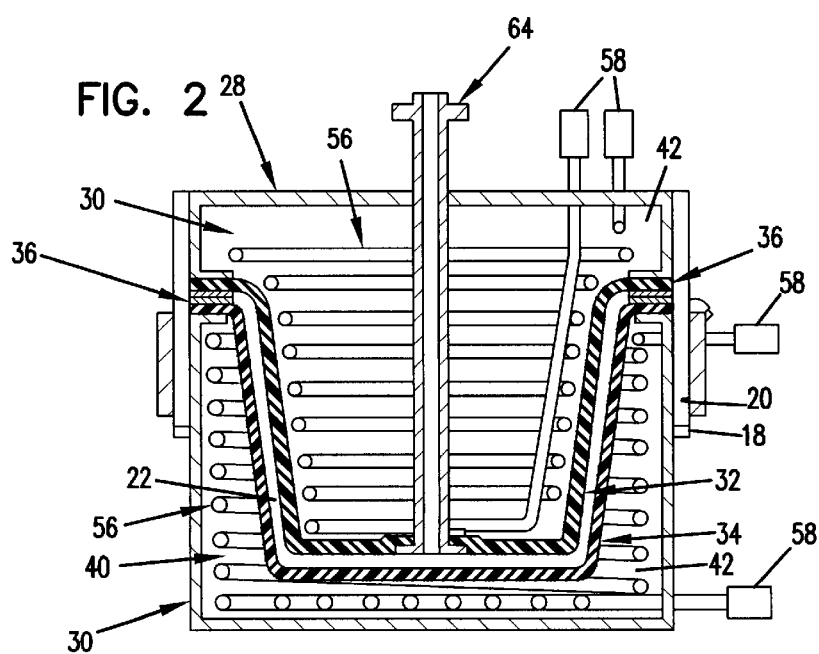

PROCESS FOR MOLDING COMPOSITE ARTICLES

This application is a divisional application of U.S. patent application Ser. No. 08/715,533 filed Sep. 18, 1996, now U.S. Pat. No. 5,971,742, which is hereby incorporated herein by reference.

TECHNICAL FIELD

The present invention relates to the manufacture of composite articles, that is, articles typically comprising a fiber reinforcement lattice within a cured resin matrix. More specifically, the invention relates to matched-tool molding apparatus suitable for injection molding composite articles at controlled temperatures with readily replaceable, low-cost tool surfaces.

BACKGROUND OF THE INVENTION

Reaction injection molding and resin transfer molding are processes wherein dry fiber reinforcement plys/preforms are loaded in a mold cavity whose surfaces define the ultimate configuration of the article to be fabricated, whereupon a flowable resin is injected under pressure into the mold cavity (mold plenum) thereby to saturate/wet the fiber reinforcement plys/preforms. After the resinated preforms are cured in the mold plenum, the finished article is removed from the mold.

The prior art teaches injection molding apparatus which consist of a pair of complementary or "matched" tools which provide these molding surfaces, which each tool being carefully machined, for example, from a rigid metal which is otherwise relatively nonreactive with respect to the resin to be used in conjunction therewith. Such matched metal molds are expensive to fabricate and are necessarily limited to the manufacture of a single article of a given design. Stated another way, even slight changes to the desired configuration of the article to be fabricated may necessitate the machining of an entirely new replacement tool.

Additionally, such known metal tools typically have substantial thermal mass which becomes increasingly problematic as the mold temperature deviates from the desired process temperatures. In response, such tools are often provided with an integral system of internal heating and/or cooling tubes or passages through which an externally supplied heating/cooling fluid may be circulated. However, in accordance with these prior art designs, the heating/cooling passages are positioned relative to the tool surfaces so as to leave a minimum spacing of perhaps 2 inches (5 cm) therebetween to ensure that the resulting article will be free of hot and cold lines or bands which might otherwise be generated in the article as a result of disparate heating/cooling rates during resin cure. This minimum spacing, in turn, inherently limits the ability of these prior art tools to accurately control temperature during the injection molding process, again, particularly where such processes are exothermic. And temperature control of the mold plenum becomes further problematic where variable-thickness articles are to be fabricated, given that the thicker portions of the article may well polymerize earlier, and will likely reach higher temperatures, than the thinner portions thereof.

Still further, where matched metal tools are utilized in processes employing reduced cycle times, the sizable thermal mass of such metal tools can often generate peak temperatures in the range of about 375° F. to about 400° F., resulting in "dry spots" which will likely render the finished article unusable. Accordingly, such matched metal tools may have to be periodically idled for sufficient time to permit the mold to cool to an acceptable operating temperature, thereby substantially increasing the cost of article fabrication using such tools. Finally, at the other end of the temperature scale, reduced mold temperatures are known to increase the rate of styrene buildup when used with resins employing styrene monomers, thereby precipitating greater frequency of styrene build-up removal and associated labor costs and equipment down-time, with an associated increase in process cost.

In an attempt to provide increased temperature control while facilitating removal of the finished article from the molding apparatus, the prior art teaches a modified molding apparatus wherein one of the mold surfaces is defined by a flexible member formed, for example, of rubber. The other mold surface is still defined by a rigid, thermally-conductive metal tool which may be backed by a pressurized fluid such as steam whereby curing heat is transferred to the mold cavity for endothermic molding operations. Unfortunately, for such endothermic processes, heating but one side of the mold cavity may limit flexibility as to surface finish and other characteristics of the resulting article and, further, limit the degree to which resin cure may be accelerated. Moreover, where such molding apparatus are used in exothermic processes, the resulting heat accelerates deterioration of the flexible mold surface, thereby preventing long-term use of the tool. Moreover, such molding apparatus often requires evacuation of the mold plenum prior to injection of the resin therein, thereby rendering use and maintenance of such molding apparatus more complex, and processes employing such apparatus more time intensive and costly.

What is needed, then, is a matched-tool injection molding apparatus featuring replaceable mold surfaces which are easier and less costly to fabricate than known rigid or flexible tools while further offering increased temperature control during both endothermic and exothermic processes thereby to provide articles of improved quality at lower cycle times.

SUMMARY OF THE INVENTION

It is an object of the present invention to provide an injection molding apparatus featuring reusable low-cost molding surfaces.

It is another object of the present invention to provide an injection molding apparatus featuring enhanced temperature control of its molding surfaces, whereby improved control of the mold process and attendant article characteristics can be achieved.

Under the present invention, an injection molding apparatus includes a pair of mold sections, wherein each mold section itself includes a rigid housing and a semi-rigid membrane removably mounted to the housing so as to define a fluid-tight chamber therein. The membrane of each mold section, which, in turn, defines its molding surface, is preferably formed of an inexpensive composite material such fiberglass or reinforced nylon, or other suitable material; and, in accordance with the present invention, different membrane materials and/or characteristics may be selected for the respective membranes of each mold section. When the two mold sections are assembled with their respective molding surfaces in opposition to one another, a molding plenum is defined within which to fabricate the desired article. Thus, under the present invention, design changes to the article are readily accommodated through alteration or replacement of the low-cost membrane(s). Stated another way, under the present invention, a given mold section housing may be outfitted with a wide variety of relatively inexpensive composite membranes useful in the production of composite articles of different shapes, sizes and characteristics, thereby greatly reducing tooling costs as compared to the prior art.

In accordance with the present invention, a noncompressible fluid is disposed within and fills the chamber of each mold section, whereby its respective membrane is supported so as to ensure proper dimensioning of the finished article while permitting slight dimensional flexing during resin injection thereby to evenly distribute any injection-pressure loading of the membrane across its entire surface. The latter feature may prove especially advantageous where a spike in injection pressure is encountered during the resin injection step. As a further advantage, such slight dimensional flexing of the membrane during resin injection is believed to improve or enhance the flow of resin through the mold plenum. An expansion chamber in fluid communication with the chamber of one or both mold sections serves to accomodate thermal expansion of the membrane-backing fluid prior to injection of resin into the mold plenum, and subsequent to cure of the finished article, with a valve operating to isolate the chamber from the expansion chamber during resin injection and cure.

And, in accordance with another feature of the present invention, the backing fluid is itself preferably thermally conductive; and the molding apparatus further includes means in thermal communication with the backing fluid within one or both of the mold sections for regulating the temperature of the backing fluid. For example, in a preferred embodiment, the temperature regulating means includes a system of coils extending within each chamber, and an external heater/chiller unit of conventional design which is connected to the coil system and is operative to circulate a temperature control fluid at a predetermined temperature therethrough. In this manner, the temperature of the backing fluid and, correlatively, of the molding surface of each mold section may be closely regulated, thereby offering improved characteristics of the finished article and/or improved control of process parameters, such as cure time and temperature. Additional benefits of such temperature regulation of molding surfaces include, for example, reduced styrene build-up, with an attendant reduction in mold down-time and mold maintenance costs as compared to prior art molding apparatus.

BRIEF DESCRIPTION OF THE DRAWINGS

FIG. 1 is a partially diagrammatic, partially exploded isometric view of an injection molding apparatus in accordance with the present invention; and FIG. 2 is a cross-sectional view of the apparatus shown in FIG. 1 along vertical plane passing through line 2—2 thereof subsequent to assembly of the upper mold section onto the lower mold section thereof.

DETAILED DESCRIPTION OF THE PREFERRED EMBODIMENT

Referring to FIG. 1, an exemplary apparatus 10 under the present invention for molding a composite article includes a mold assembly 12 having an upper mold section 14 and a lower mold section 16 which define, upon assembly of the upper mold section 14 onto the lower mold section 16 with the aid of locating pins 18 and complementary locating slots 20, a mold plenum 22 with the matched molding surfaces 24,26 thereof. Specifically, the lower and upper mold sections 14,16 each include a rigid housing 28,30 and a relatively thin, semi-rigid membrane 32,34 which is removably and sealably secured to the espective housing 28,30 along the membrane's peripheral edge as by a clamping ring 36. Thus assembled, the housings 28,30 and membranes 32,34 of each mold section 14,16 cooperate to define fluid-tight chambers 38,40 therein.

In accordance with one feature of the present invention, each membrane 32,34 is itself preferably formed of a composite overlay which, in its most elegant form, may simply comprise splash off of a blank of the article to be fabricated. And, while each membrane 32,34 may conveniently be formed of fiberglass or reinforced nylon, the present invention contemplates use of semi-rigid membranes 32,34 fabricated from other suitable materials such as light sheet metal, which membranes 32,34 may be conveniently and cheaply fabricated, shaped and reshaped in a pressure chamber in a manner known to those skilled in the art. In this regard, it is noted that the present invention contemplates use of either the same or different materials for the respective membranes 32,34 of each mold section 14,16 depending, for example, upon the desired characteristics of the sheet (e.g., its thermal conductivity, formability, and usable life), the desired characteristics of the fabricated article (e.g., surface finish and gloss), and/or overall process parameters (e.g., resin injection pressures, resin cure time and mold assembly cycle time).

The fluid-tight chambers 38,40 defined within each mold section 14,16 are completely filled with a substantially non-compressible heat-conductive fluid 42 supplied by a fluid supply network 44 prior to injection of resin into the mold plenum 22. The fluid 42 within each chamber 38,40 thereby provides support for each membrane 32,34 in compression during resin injection in a manner to be further described below.

In the preferred embodiment shown in FIG. 1, the membrane-backing fluid 42 is conveniently tap water which is supplied by the network 44 to the upper and lower mold assemblies 14,16 as through respective inlet control valves 46 and quick connect couplings 48. Other suitable backing fluids useful over different operating ranges (e.g., having higher vaporization temperatures) will be known to those skilled in the art. A pressure gauge 50 may be employed downstream of each inlet valve 46 to monitor the flow rate of backing fluid 42 into the chamber 38,40 of each mold section 14,16. To facilitate the filling and emptying of each chamber 38,40, each mold section 14,16 has a vent 52 through which air within each chamber 38,40 may escape upon the filling thereof with backing fluid 42. Once filled, each chamber's vent 52 is sealed with a vent plug 54, thereby imparting requisite rigidity to each mold section's membrane/molding surface 24,26.

As seen in FIG. 2, wherein the relative dimensions of, for example, the membranes 32,34 and mold plenum 22 are exaggerated for ease of illustration, each mold section 14,16 includes a system of heating/cooling coils 56 extending within the fluid-tight chamber 38,40 thereof which are themselves coupled via quick connect couplings 58 to an external heater/chiller unit 60 of conventional design. As such, the coils 56 operate in conjunction with the heater/chiller unit 60 to precisely regulate the temperature of the backing fluid 42 and, hence, the molding surface 24,26 of each membrane 32,34 throughout the injection molding process. And, while the coils are illustrated in FIG. 2 as being located proximate to the back side of the composite membrane, under the present invention, the thermal conductivity of the backing fluid 42 enables substantial design variation with respect to placement of the coils 56 within the chamber 38,40 of each mold section 14,16 which, in turn, facilitates use of a given mold section housing 28,30 and coil system 56 with a wide variety of membranes 32,34. Indeed, under the present invention, while the membranes 32,34 of the exemplary apparatus 10 are shown in FIG. 2 as being of relatively uniform thickness, the efficiency with which mold temperature may be controlled under the present invention permits the use of variable-thickness membranes 32,34, as may be desirable, for example, when providing the finished article with reinforcement ribs.

To the extent that the backing fluid 42 with which each mold section 14,16 is filled is supplied at a temperature different from the desired process temperature, the fluid supply network 44 further includes a low-pressure expansion chamber 62. Thus, upon subsequent heating or cooling of each mold section 14,16 to the desired temperature, any resulting thermal expansion of the backing fluid 42 within each chamber 38,40 will be accommodated by the expansion chamber 62, thereby preventing distortion and/or deleterious stress on the membranes 32,34.

Returning to the Drawings, an injection sprue 64 may be seen in FIG. 2 as extending through the upper mold section 14 to provide a pathway through which a desired thermoset resin from a resin supply 66 may be injected under pressure by a suitable pump 68 into the mold plenum 22. The number and placement of such sprues 64 depends upon the configuration and desired characteristics of the article to be molded, and the flow characteristics of the resin employed, in a manner known to those skilled in the art. In this regard, it will be seen that a series of small vents 70 is provided between the opposed clamping rings 36 of the upper and lower mold sections 14,16 through which trapped air may bleed to atmosphere during injection of the resin into the mold plenum 22.

In accordance with another feature of the present invention, the exemplary molding apparatus 10 further includes a mechanism indicated generally by reference numeral 72 on the lower mold section 16 for vibrating the mold assembly 12 or, at a minimum, the backing fluid 42 contained in the lower mold section 16. Vibration of the mold assembly 12/backing fluid 42 during injection of the resin is believed to facilitate resin flow through the mold plenum 22, as well as to improve saturation and wetting of fiber reinforcement preforms (not shown) situated therein.

In accordance with the present invention, the exemplary molding apparatus shown in the Drawings may be used as follows: one or more fiber reinforcement preforms are laid within the mold cavity defined by the "female" molding surface 26 of the lower mold section 16. The upper mold section 14 is thereafter lowered onto the lower mold section 16 so as to engage each locating pin 18 with its respective locating slot 20 (where desired, the upper mold section 14 may then be secured to the lower mold section 16 as through the use of suitable clamps, not shown). Each mold section 14,16 is then connected to the backing fluid (water) supply network 44, and its respective vent 52 is opened and inlet valve 46 is operated, thereby to completely fill the chamber 38,40 therein with water.

Once the chambers 38,40 are completely filled, each mold section vent 52 is sealed with its respective vent plug 54 and the heater/chiller unit 60 operated to bring each mold section 14,16 to the desired process temperature. The inlet valve 46 to each mold section 14,16 is thereafter closed to isolate its respective chamber 38,40 from the fluid supply network's expansion chamber 62 (which otherwise has accommodated any thermal expansion of the backing fluid 42 during temperature normalization). By way of example only, where the resin to be injected is a thermoset polyester or vinylester resin, the desired operating temperature necessary to provide desired flow characteristics for a given thermoset polyester or vinylester resin has been shown to be 140° F. to about 150° F.

The desired resin is thereafter injected under pressure into the mold plenum 22 through the injection sprew 64. Where the membranes are formed, for example, of fiberglass with a nominal thickness of perhaps about 0.375 inches (0.95 cm), a typical injection pressure used in injecting a thermoset polyester or vinylester resin having a viscosity between of between about 400 and 500 centipoise into the mold plenum 22 is preferably less than about 100 psig (690 kPa) and, most preferably, less than about 60 psig (410 kPa). Of course, the optimal flow rate at which the resin is injected is based upon a number of factors well known to those skilled in the art.

Once the mold plenum 22 is completely filled with resin, as visually confirmed by discharge of resin through the air bleeds formed in the clamping rings 36 of each mold section 14,16, the injection of resin ceases. The temperature of each molding surface 24,26 is thereafter regulated via operation of the heater/chiller unit 60 to thereby provide an optimum cure rate with which to obtain the desired surface finish and/or other desired characteristics of the finished article, or to otherwise optimize the molding process. The mold sections 14,16 are thereafter separated, and the finished article removed from the mold cavity in a conventional manner.

In accordance with another feature of the present invention, due to the semi-rigid character of the lower mold section's membrane 34, the membrane 34 will dimensionally flex slightly during resin injection as the backing fluid 42 distributes the resulting injection pressure load across the entire surface of the membrane 34. In this manner, the semi-rigid membrane 34 avoids deleterious stress concentration on its molding surface 26 during resin injection. Indeed, the slight flexing of the molding surfaces 24,26 of one or both membranes 32,34 during resin injection is believed to further improve or enhance the flow of resin through the mold plenum 22, which effect may be further enhanced by deliberately pulsing the injected resin, all without deleterious impact on the molding tools (the membranes 32,34).

While the preferred embodiments of the invention have been disclosed, it should be appreciated that the invention is susceptible of modification without departing from the spirit of the invention or the scope of the subjoined claims. For example, while the preferred embodiment employs membrane-backing fluid 42 which is itself fully contained within the chamber 38,40 of each mold section 14,16, to be heated or cooled by heater/chiller unit 60 via coils 56, the present invention contemplates the use of a closed loop temperature regulating system wherein the backing fluid 42 is itself circulated between each mold section's internal chamber 38,40 and the heater/chiller unit 60.

I claim:

1. A method of molding a composite article comprising the steps:

a. arranging in a spaced apart opposed relationship a first mold section comprising a first semi-rigid membrane removably mounted to a first rigid housing to define a first fluid tight chamber therein and a second mold section comprising a second semi-rigid membrane removably mounted to a second rigid housing to define a second fluid tight chamber therein;

b. defining a mold plenum between the first and second semi-rigid membranes when the first and second mold sections are closed together to mold articles;

c. filling the first and second fluid tight chambers with a substantially non-compressible backing fluid to support each membrane during injection of a molding fluid;

d. accommodating thermal expansion of the backing fluid by an expansion chamber in fluid communication with the first and second fluid tight chambers;

e. inserting reinforcement materials between the first and second semi-rigid membranes prior to closing the first and second mold sections together to mold articles;

f. closing the first and second mold sections towards each other such that the reinforcement materials are sandwiched in the mold plenum;

g. rigidly retaining the first and second mold sections together with the reinforcement materials sandwiched in the mold plenum;

h. injecting molding fluid under pressure into the mold plenum;

i. distributing a resulting injection pressure by the backing fluid; and j. curing the molding fluid by heating at least one of the backing fluid to produce a molded article.

2. The method of claim 1 further comprising isolating said expansion chamber during at least one of said injecting molding fluid and said curing said molded article.

3. The method of claim 1 further comprising regulating the temperature of the backing fluid by a system of coils extending within each fluid tight chamber wherein the coils are connected to an external heater/chiller unit and the coils are operative to circulate a temperature control fluid therethrough.

4. The method of claim 3 further comprising the step of regulating the temperature of the molding surface of the semi-rigid membrane of each mold section.

5. The method of claim 1 comprising the step of pulsing the molding fluid during injecting of molding fluid to the mold plenum.

6. The method of claim 1 comprising the step of vibrating a mold assembly formed by closing the mold sections together during injecting of molding fluid to the mold plenum.

* * * * *